July 28, 1970 K. A. SCHNIZLER, JR 3,521,682

BAND SAW

Filed Sept. 20, 1967 3 Sheets-Sheet 1

INVENTOR
KARL ALBRECHT SCHNIZLER, JR.

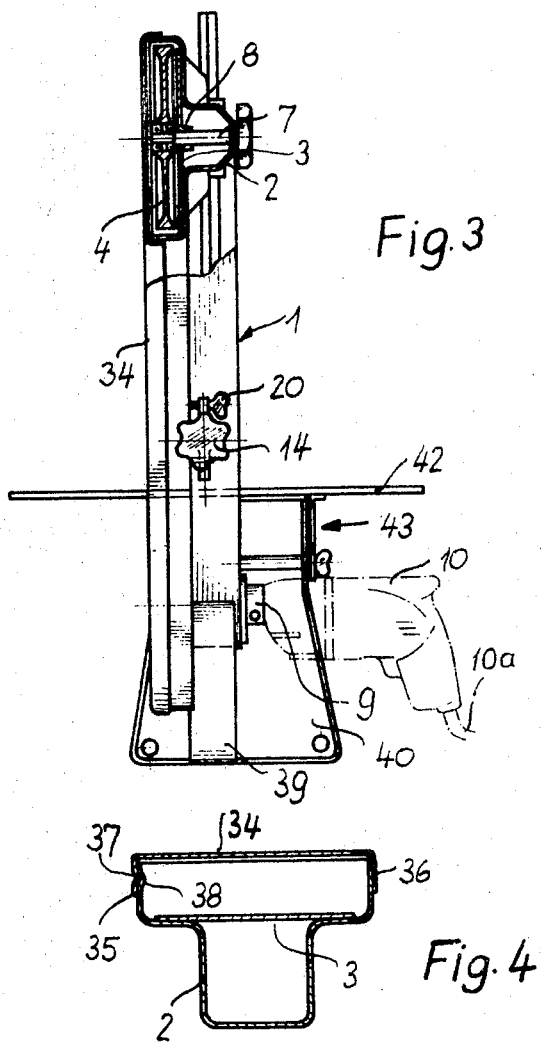

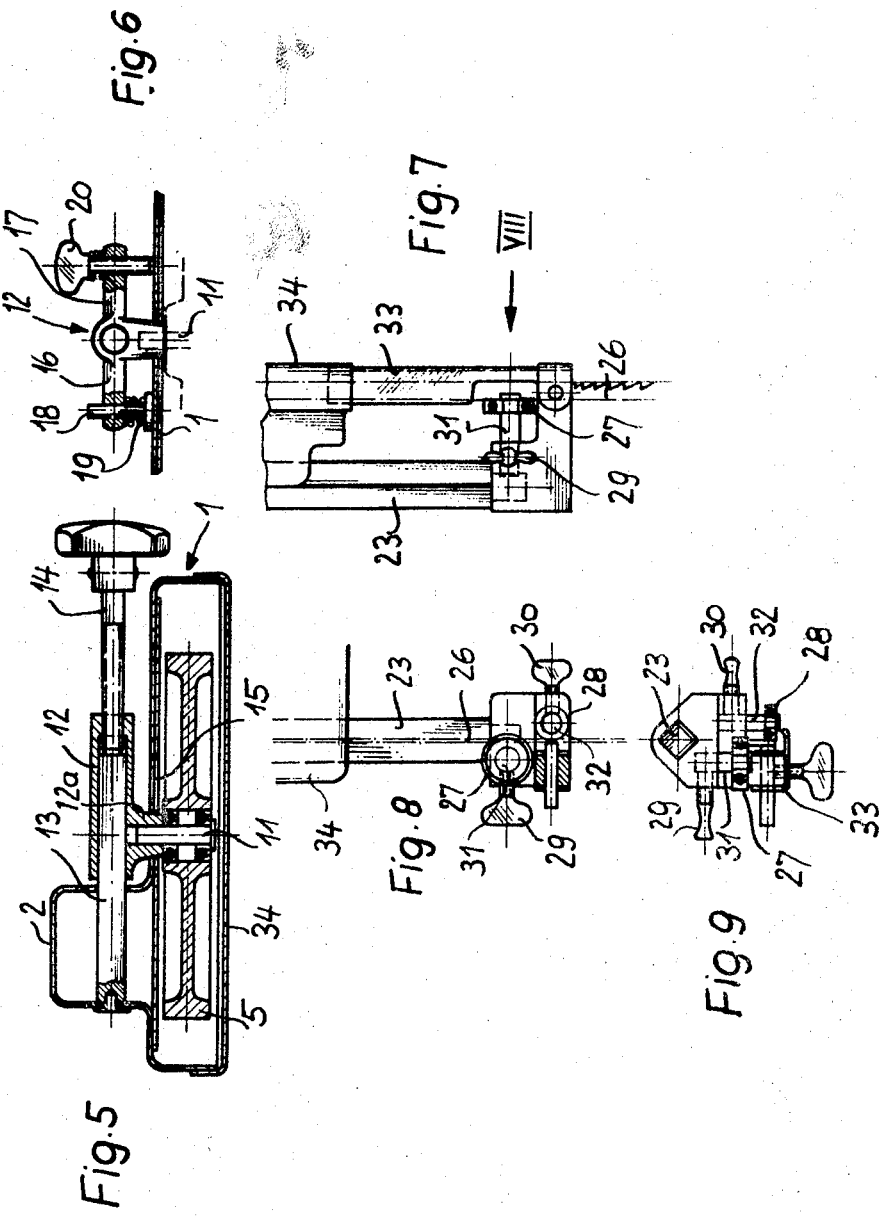

United States Patent Office 3,521,682
Patented July 28, 1970

3,521,682
BAND SAW
Karl Albrecht Schnizler, Jr., Nurtingen Wurttemberg, Germany, assignor to Metabowerke KG. Closs, Rauch & Schnizler, Nurtingen, Wurttemberg, Germany
Filed Sept. 20, 1967, Ser. No. 669,195
Claims priority, application Germany, Sept. 22, 1966, M 56,355
Int. Cl. B27b 13/00
U.S. Cl. 143—21          17 Claims

ABSTRACT OF THE DISCLOSURE

The frame of a band saw consists of sheet metal and is provided with integral stiffening portions which also serve as bearings for the wheels and as a carrier for the device which tensions and aligns the toothed band. The major portion of the band is concealed in the frame which is provided with a detachable cover to afford convenient access to the band. The stiffening portions of the frame carry a guide for the exposed straight portion of the band.

BACKGROUND OF THE INVENTION

The present invention relates to band saws in general, and more particularly to improvements in the construction, design and assembly of frames, band protectors and wheels for band saws.

It is known to provide a band saw with a cast iron frame which supports the wheels for the toothed ribbon or band and also carries a protective shield which overlies the major portion of the band at the working side of the saw. A serious drawback of a cast frame is that it is too heavy, expensive, often bulky and impractical for use in band saws for tinkers.

SUMMARY OF THE INVENTION

It is an object of my invention to provide a simple, lightweight and inexpensive but rugged frame for use in band saws and to construct and assemble the frame in such a way that it can perform certain functions which, heretofore, were performed by separately produced parts.

Another object of the invention is to provide a band saw which embodies the improved frame and wherein the blade or ribbon is readily accessible for cleaning, inspection or replacement.

A further object of the invention is to provide a frame which simultaneously performs the function of a protective shield for the ribbon in a band saw.

An additional object of the invention is to provide a band saw wherein the frame is just as rugged as a cast iron frame but is considerably lighter and can be produced at a much lower cost.

Still another object of the invention is to provide a novel tensioning device for the ribbon of a band saw which embodies the above outlined frame.

An ancillary object of my invention is to provide a simple and readily adjustable guide for the exposed portion of the ribbon in a band saw of the above outlined type.

A concomitant object of the invention is to provide a band saw wherein the ribbon can be driven by different types of available prime movers.

Briefly outlined, my invention is embodied in a band saw which comprises a preferably V-shaped frame consisting of metallic sheet stock and provided with integral stiffening means which preferably includes an elongated V-shaped hollow rib, a plurality of coplanar wheels rotatably mounted in the frame, an endless toothed ribbon trained around the wheels and having a straight portion which is located outside of the frame so that it can engage and cut a workpiece which is being fed thereagainst, and protecting or shielding means for the remaining major portion of the ribbon, such shielding means including a portion of the frame. Thus, the frame not only serves to support the wheels but it also shields the major portion of the ribbon and is provided with integral stiffening means so that it can withstand all reasonable stresses which arise when the band saw is in use even though its weight is but a fraction of the weight of a cast iron frame.

The novel features which are considered as characteristic of the invention are set forth in particular in the appended claims. The improved band saw itself, however, both as to its construction and its mode of operation, together with additional features and advatnages thereof, will be best understood upon perusal of the following detailed description of a specific embodiment with reference to the accompanying drawing.

BRIEF DESCRIPTION OF THE DRAWING

FIG. 3 is a partly end elevational view and seen in the direction of the arrow III' and partly vertical sectional view as seen in the direction of arrows from the line III—III of FIG. 1;

FIG. 4 is an enlarged sectional view as seen in the direction of arrows from the line IV—IV of FIG. 1;

FIG. 5 is an enlarged horizontal sectional view as seen in the direction of arrows from the line V——V of FIG. 1 and illustrates the details of a tensioning device for the ribbon;

FIG. 6 is a fragmentary transverse sectional view of the structure shown in FIG. 5;

FIG. 7 is an enlarged end elevational view of a guide substantially as seen in the direction of the arrow VII in FIG. 1;

FIG. 8 is a view as seen in the direction of arrow VIII in FIG. 7; and

FIG. 9 is a top plan view of the structure shown in FIG. 7 or 8.

DESCRIPTION OF THE PREFERRED EMBODIMENTS

Figure 1:
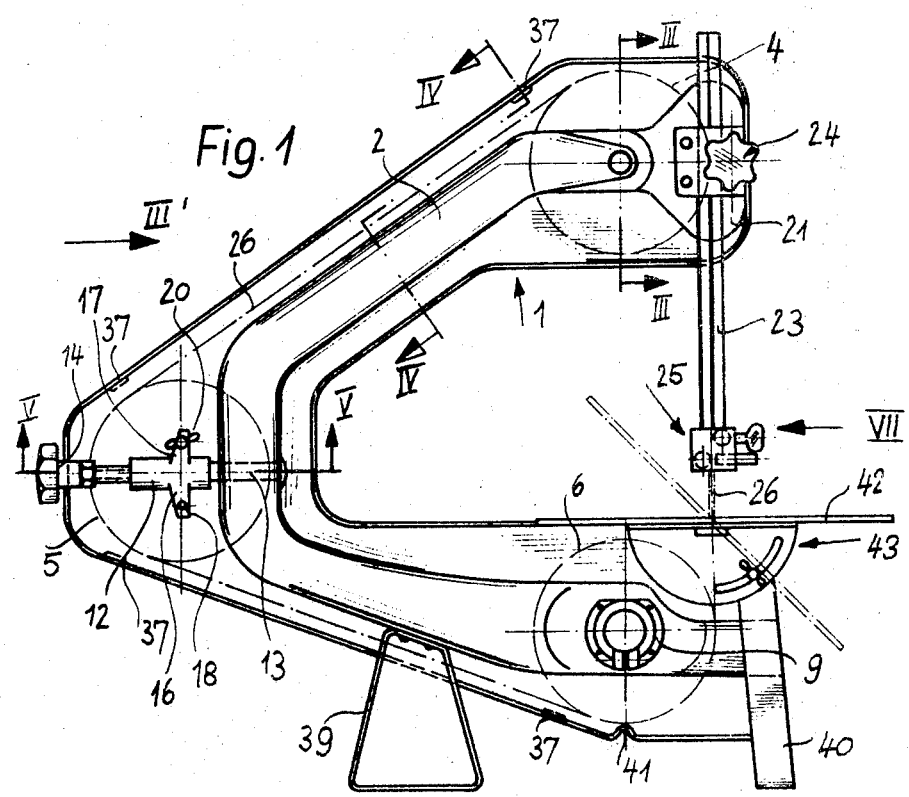
FIG. 1 is a side elevational view of a band saw which embodies my invention.
Figure 2:
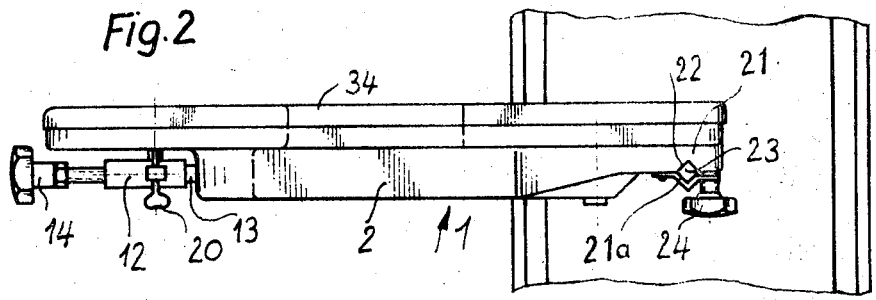
FIG. 2 is a top plan view of the band saw.

The frame 1 of the band saw shown in FIGS. 1 to 3 simultaneously constitutes the guard or shield and is made of sheet metal which is formed with a deep reinforcing or stiffening rib 2. The frame 1 is V-shaped and the rib 2 is of similar configuration, see particularly FIG. 1. An inner cover 3 (see FIG. 4) overlies the open side of the rib 2 in the frame 1 to constitute an additional stiffening element. Thus, the rib 2 and the inner cover 3 together form a hollow reinforcing extension of the frame 1 and such extension is of substantially rectangular outline as best shown in FIG. 4 but its cross-sectional area varies along its length. The inner cover 3 can be secured to the frame 1 by spot welding.

The frame 1 supports an idler wheel 4, an adjustable tensioning roll or wheel 5, and a driver wheel 6. These wheels are located in a common plane. As shown in FIG. 3, the idler wheel 4 is mounted on a bolt or shaft 7 which extends through a sleeve 8 provided in the inner cover 3 and through an opening provided therefor in the web of the stiffening rib 2. The driver wheel 6 is mounted in a bearing sleeve 9 which is connected with an electric motor 10 or with another suitable prime mover. The electric motor 10 preferably forms part of a drilling or boring machine of the portable type which can be connected to a suitable outlet, not shown. The cable of the motor 10 is shown in FIG. 3 at 10a. As stated before, the electric motor 10 constitutes but one of several prime movers which can be employed to drive the wheel 6. The sleeve 9 is screwed or bolted to the frame 1.

As best shown in FIGS. 1, 2 and 5, the tensioning roll or wheel 5 is mounted on a pin or stud 11 which is press-fitted into an adjustable holder 12. The latter is slidable along a guide rod 13 attached to the rib 2 and can be shifted by means of a screw 14. This screw meshes with the holder 12 and its tip bears against the guide rod 13. The guide rod 13 is substantially parallel with the general plane of the frame 1, and the pin 11 is normal to the guide rod 13 and screw 14. A nipple 12a of the holder 12 is slidable with lateral clearance in a slot 15 provided in the frame 1 in parallelism with the axis of the guide rod 13.

The just described tensioning mechanism of the band saw can also be used as a means for regulating the inclination of the endless band or ribbon 26 which is trained around the wheels 4, 6 and tensioning roll 5. To this end, the holder 12 is provided with two arms or wings 16, 17 shown in FIG. 6. The arm 16 is guided by a post 18 which is affixed to the frame 1 and this arm 16 is biased by a helical expansion spring 19. The other arm 17 of the holder 12 meshes with an adjusting or tilting screw 20 whose tip bears against the frame 1. By rotating the screw 20, the operator can turn the holder 12 on the guide rod 13 whereby the holder changes the inclination of the pin 11 and tensioning roll 5. This serves to adjust the plane of the ribbon 26.

The rib 2 is provided with an enlarged portion or enlargement 21 which is adjacent to the idler wheel 4 (see FIG. 1). The enlargement 21 is connected with a strap 21a and defines therewith a polygonal channel or passage 22 for a supporting bar 23 of preferably rectangular cross-sectional outline. The strap 21a forms part of a clamping device which further includes a knob 24 having a stem which meshes with the enlargement 21. By turning the knob 24, the operator can tighten the strap 21a around the bar 23. The lower end portion of the bar 23 carries a guide 25 for a straight vertical portion of the ribbon 26. The details of the guide 25 are illustrated in FIGS. 7 to 9. The ribbon 26 travels between two antifriction bearings 27, 28 which are mounted on axially movable shafts 31, 32. These shafts can be locked in selected axial positions by screws 29, 30. The guide 25 further carries a protective shield or guard 33 connected to a protector sheet or outer cover 34 that covers the open side of the frame 1 (see FIG. 4). The sheet 34 covers the entire open side of the frame 1 and is substantially parallel with the inner cover 3. This sheet has bent-over marginal portions 35, 36 having longitudinally spaced protuberances 37 which can snap into registering notches or depressions 38 of the frame 1. Thus, the sheet or outer cover 34 can be secured to the frame 1 by snap action. This permits for rapid separation of the sheet 34 when it becomes necessary to inspect, clean or replace the ribbon 26. The guard 33 is removable with or in response to removal of the sheet 34 to fully expose the ribbon 26. Prior to removal of this ribbon, the screw 14 is rotated in a sense to reduce the tension of the ribbon by moving the roll 5 toward the common plane of the axes of wheels 4 and 6, i.e., in a direction to the right, as viewed in FIG. 1.

The frame 1 is provided with integral legs 39, 40 (FIGS. 1 and 3) and its underside is formed with a transverse groove 41 which can receive a portion of a supporting rod or bar (not shown) when the band saw of my invention is to be mounted on a bench or the like in an amateur workshop. Such bench can support a number of different machines and may be provided with one, two or more supporting members for such machines. The lower portion of the frame 1 further carries a tiltable table 42 which is provided with an arresting device 43 of known design serving to hold it in a desired position of inclination. The table 42 is used for cutting of bevels or the like in a manner known from the art of scroll saws.

An important advantage of my band saw is that its frame can fully conceal all such portions of the ribbon 26 which are not needed for cutting of wood or the like and that this frame is a low-cost but highly satisfactory substitute for customary cast iron frames of conventional band saws. Moreover, the frame and its stiffening means also serve to support the wheels and the tensioning roll which contributes to a considerable reduction in manufacturing cost. The rib 2 not only serves as a strong and inexpensive stiffener for the frame 1 but also as a means for supporting several important elements of the band saw, such as the wheels 4, 6, the rod 23 for the guide 25, the guide rod 13 for the tensioning device, and others. The cross section of the rib 2 varies so that the rib can readily support the aforedescribed parts of the band saw. The cross section can vary due to changes in the depth and/or width of the rib.

What is claimed as new and desired to be protected by Letters Patent is set forth in the appended claims:

1. A band saw comprising a hollow frame consisting of metallic sheet stock said frame having an open side and integral stiffening means projecting to the other side of the frame and comprising an elongated rib of substantially U-shaped cross-section having an open side in said frame; an inner cover overlying at least a portion of said open side of said U-shaped rib and being fixed in the frame to the latter; an outer cover extending over said open side of said frame removably connected thereto and forming with said inner cover a space accessible from the outside upon removal of said outer cover; a plurality of substantially coplanar wheels in said space; an endless toothed ribbon trained about said wheels; a plurality of shafts extending into said space and having free ends spaced from said outer cover and respectively supporting said wheels turnable about substantially parallel axes; and means supporting said shafts, said means being exclusively connected to said stiffening means and said inner cover so that said outer cover may be removed from said casing for inspection and removing said ribbon while said shafts and wheels thereon remain properly supported.

2. A band saw as defined in claim 1, wherein said rib comprises portions of different cross section.

3. A band saw as defined in claim 1, further comprising tensioning means for said ribbon, said tensioning means including one of said wheels and said one wheel engaging a portion of said ribbon.

4. A band saw as defined in claim 3, wherein said tensioning means further comprises a single elongated guide member mounted in said stiffening means and extending in substantial parallelism with the plane of said wheels, a holder reciprocably guided by said member, and a pin supporting said one wheel and mounted on said holder to share reciprocatory movements of said holder along said guide member.

5. A band saw as defined in claim 4, wherein said tensioning means further comprises a shifting screw meshing with said holder and having an end portion abutting against one end of said elongated guide member.

6. A band saw as defined in claim 4, wherein said holder is turnable on said guide member and further comprising adjusting means for turning said holder to thereby change the inclination of the plane of said one wheel.

7. A band saw comprising a plurality of substantially coplanar wheels; an endless toothed ribbon trained around said wheels; a frame consisting of metallic sheet stock and rotatably supporting said wheels, said frame having integral stiffening means; shielding means including a portion of said frame and providing a protective housing around a substantial length of said ribbon; and tensioning means for said ribbon, said tensioning means including one fo said wheels, an elongated guide member mounted in said stiffening means and extending substantially parallel to the plane of said wheels, a holder reciprocably guided by said member and turnably mounted thereon, a pin supporting said one wheel and mounted on said holder to share reciprocating movement of the latter along said guide member, and adjusting means for turning said holder to thereby change the inclination of the plane of said one wheel, said adjusting means comprising a pair of arms extending from said holder in opposite directions, biasing means operating between one of said arms and said frame to bias said holder in one direction about said guide member, and means cooperating with the other of said arms to turn the holder in opposite direction against the opposition of said biasing means.

8. A band saw as defined in claim 7, wherein said adjusting means further comprises a post carried by said frame and extending into an aperture of said one arm.

9. A band saw as defined in claim 7, wherein said biasing means comprises a spring interposed between said frame and said one arm.

10. A band saw as defined in claim 1, wherein a straight portion of said ribbon extends from said frame and wherein said elongated rib which in integral with said frame extends along a substantial part of the remainder of said ribbon, and further comprising guide means carried by said rib for said straight portion.

11. A band saw as defined in claim 10, wherein said rib comprises an enlarged portion adjacent to one of said wheels and supporting said guide means.

12. A band saw as defined in claim 11, wherein said guide means comprises an elongated supporting member means for releasably clamping said supporting member to said enlarged portion, and a ribbon-engaging assembly provided on said supporting member.

13. A band saw as defined in claim 10, further comprising a guard for said straight portion of the ribbon and means for securing said guard to said frame.

14. A band saw as defined in claim 1, wherein said outer cover is detachably secured to said frame by snap action.

15. A band saw as defined in claim 1, wherein said frame is substantially V-shaped and comprises two end portions each of which supports one of said wheels, and further comprising a prime mover for driving one of said wheels.

16. A band saw as defined in claim 1, wherein said means for supporting at least one of said shafts comprises a bearing sleeve integral with said inner cover.

17. A band saw comprising a plurality of substantially coplanar wheels; a frame consisting of metallic sheet stock and rotatably supporting said wheels; an endless toothed ribbon trained about said wheels and having a straight portion extending from said frame; stiffening means comprising an elongated rib integral with said frame and extending along a substantial part of the remainder of said ribbon; guide means carried by said rib for said straight portion of said ribbon; a guard for said straight portion of said ribbon; and means for securing said guard to said frame and comprising an outer cover providing a protective housing around a substantial length of said ribbon and being secured to said frame.

References Cited

UNITED STATES PATENTS

| | | | |
|---|---|---|---|
| 2,579,955 | 12/1951 | Orescan | 143—21 X |
| 2,625,964 | 1/1953 | Green et al. | 143—21 |
| 2,798,518 | 7/1957 | Gray | 143—19 |

FOREIGN PATENTS 489,778 2/1932 Germany.

ANDREW R. JUHASZ, Primary Examiner

J. F. COAN, Assistant Examiner

U.S. Cl. X.R.

83—201; 143—19; 144—35